Feb. 1, 1949.    G. HOHWART ET AL    2,460,577
DIAPHRAGM CHUCK
Filed June 10, 1947
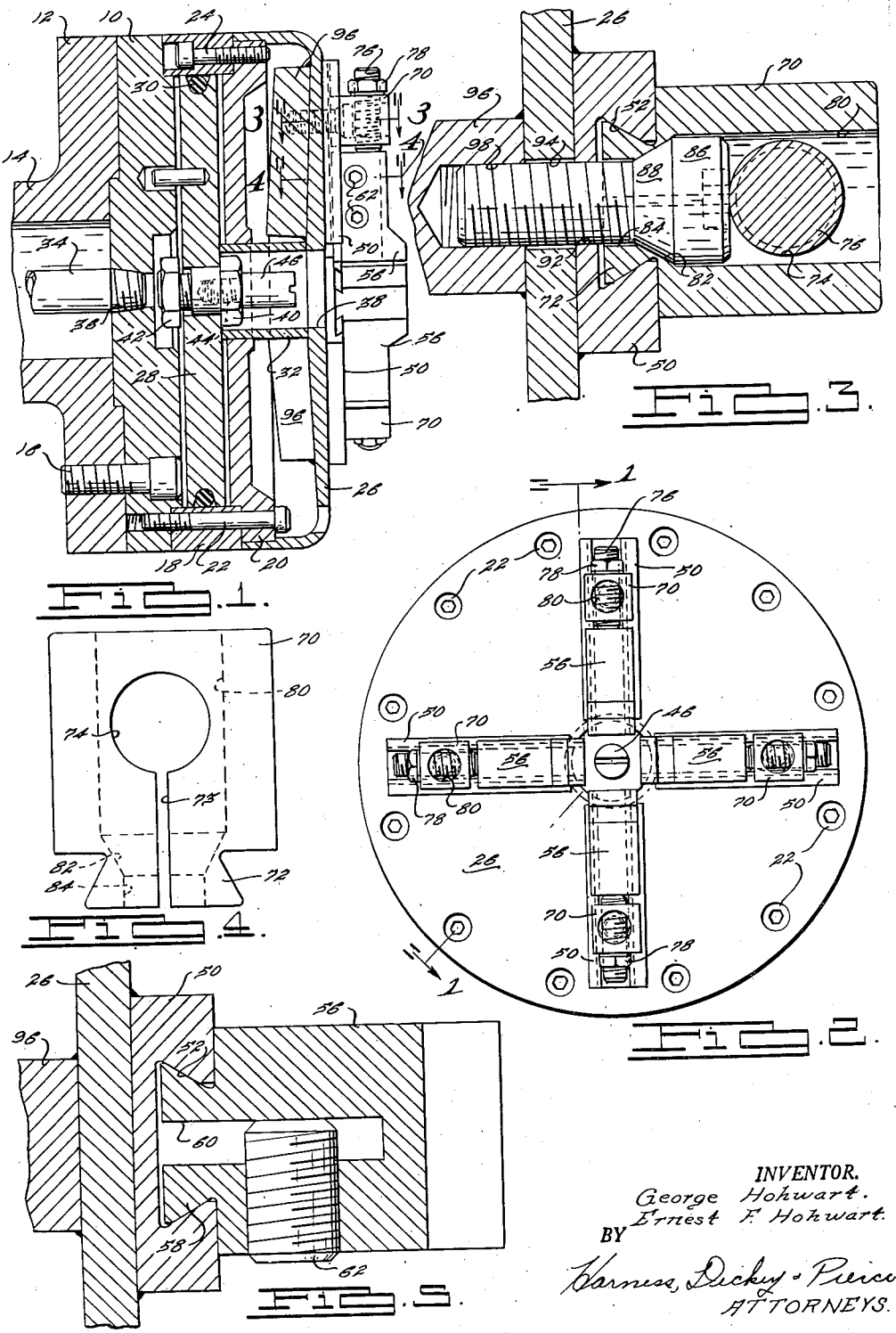
INVENTOR.
George Hohwart.
Ernest F. Hohwart.
BY Harness, Dickey & Pierce.
ATTORNEYS.

Patented Feb. 1, 1949

2,460,577

UNITED STATES PATENT OFFICE 2,460,577

DIAPHRAGM CHUCK

George Hohwart and Ernest F. Hohwart, Detroit, Mich., assignors to N. A. Woodworth Company, Ferndale, Mich., a corporation of Michigan Application June 10, 1947, Serial No. 753,786

5 Claims. (Cl. 279—46)

This invention relates to diaphragm chucks and particularly to a new and novel means for backing up the work-engaging jaws against radial outward movement in service, and constitutes an improvement over the construction shown and described in our copending application for Letters Patent of the United States for improvements in Diaphragm chuck, filed July 13, 1946, and serially numbered 683,457.

An important object of the present invention is to provide a diaphragm chuck having novel and improved means for mounting the back-upblock on the jaw base behind each clamping jaw.

The present invention resides in certain novel features of construction and combinations of parts to be hereinafter described with reference to the accompanying drawing, and then claimed.

In the accompanying drawing which illustrates a suitable embodiment of the present invention and in which like numerals refer to like parts throughout the several different views, Fig. 1 is a sectional view taken longitudinally through the center of the diaphragm chuck embodying the present invention, as on the line 1—1 of Fig. 2;

Fig. 2 is a face view of the diaphragm chuck shown in Fig. 1;

Fig. 3 is an enlarged, fragmentary, transverse sectional view taken on the line 3—3 of Fig. 1, illustrating the back-up member in greater detail and the method of securing it to the diaphragm of the chuck;

Fig. 4 is an elevational view of the back-up member alone, taken looking in the same direction as the view of Fig. 3; and Fig. 5 is an enlarged transverse sectional view taken on the line 4—4 of Fig. 1 to better illustrate the manner of mounting and locking the jaw members on the diaphragm of the chuck.

It is desirable in diaphragm chucks that the jaws thereof be adjustable radially in order to adapt the chuck to receive work pieces of different diameters. However, in order for such adjustable jaw construction to be practical, means must be provided for locking the jaws in their adjusted positions positively against inadvertent movement. This is important for the reason that diaphragm chucks are usually employed for grinding or other machine operations on a piece of work where concentricity between the machined surface and the part must be held within very close limits, so that any shifting or creeping of one or more of the jaws in service might render the chuck temporarily, at least, useless and might result in the production of scrap pieces if use is continued after shifting of a jaw. In this respect, it is important to appreciate that diaphragm chucks, unlike conventional chucks having radially adjustable jaws, do not depend upon the radial adjustment of the jaws with respect to the face of the chuck for clamping a workpiece in the jaws. Diaphragm chucks are employed where a large number of pieces of identical size are to be machined one after the other, and the jaws in such case are initially adjusted to correspond to the size of the workpiece to be machined, and are then locked in place and are held in fixed relation with respect to the face of the chuck until that particular run of workpieces is completed. The axial springing of the center portion of the diaphragm of the chuck is relied upon to move the jaws radially a sufficient amount to permit the insertion and removal of the workpieces and the creation of sufficient force between the jaws and the workpiece to hold the latter firmly for the required machining operation thereon. The present invention provides a novel means for locking the adjusting screw supporting member or back-up member against inadvertent displacement on the diaphragm of the chuck.

In our prior application above identified, the axially inner end of the back-up member is provided with a dovetail projection received in the dovetail slot of the jaw base which also receives the jaw. The back-up member is provided with a transverse opening therein parallel to the axis of rotation of the chuck, which receives a pointed set or locking screw, the inner end of which is adapted to be received in a recess formed in the bottom of the dovetail slot of the jaw base. Tightening of the locking screw forces the dovetail projection of the back-up member outwardly with respect to the dovetail slot in the jaw base, thus frictionally locking the back-up member to the sides of the groove in the jaw base and mechanically locking the back-up member against movement radially in the jaw base through interengagement of the point of the setscrew in the mentioned recess. The effect of this construction is, however, to force the shoulders of the back-up member opposed to the outer face of the jaw base and such outer face away from each other, thus limiting the frictional engagement between the back-up member and the jaw base solely to the interengaging dovetail faces. The back-up member of our prior construction was, however, positively locked against outward movement in the jaw base under centrifugal force during operation by reason of the fact that the adjusting screw of the corresponding jaw is threaded radially through the back-up member in substantial contact with the axially outer end of the aforementioned setscrew, thus mechanically locking the set screw against being backed up sufficiently to permit the inner end of the screw from being withdrawn from its corresponding recess in the bottom of the jaw base dovetail groove.

In accordance with the present invention, the back-up member may be substantially the same as that shown in our prior application above identified with the exception, however, that the axially inner end of the back-up member is diametrically slotted outwardly as far as the threaded openings for the adjusting screw, and instead of employing a setscrew, a screw having a frusto-conical head portion is projected in parallel relation to the axis of the chuck into the back-up member and is threaded into the jaw base at its inner end and preferably into the counterweight therebehind. The bore in the back-up member provided for receiving the mentioned screw is provided adjacent its inner ends with a frusto-conical surface complementary to that of the screw, so when the screw is tightened up the frusto-conical surface of the screw tends to spread the inner end of the back-up member to frictionally bind the dovetail projection thereof within the dovetail groove of the jaw base, and, also, because of this spreading action as well as the inward thrust of the screw, not only frictionally binds the back-up member to the jaw base through the interengaging dovetail surfaces, but also frictionally locks the inner end face of the back-up member against the outer face of the jaw base, this latter being a feature that is lacking in our prior construction.

As a result of the improvement provided by the present invention over that disclosed in our prior application above identified a more secure engagement between the back-up member and the jaw base is provided, so much so that to date no reports have been received of any creeping or shifting of the jaws backed up with this back-up member in service. It may also be noted that, as in the construction shown and described in our prior application above identified, the adjusting screw for the associated jaw is threaded through this back-up member and extends in mechanically locking relationship with respect to the head of the back-up member locking screw so that, similar to the first described construction, loss of the locking screw because of inadvertent loosening thereof, and consequent freeing of the back-up member so that it might fly out of the jaw base under centrifugal force during operation, is positively precluded.

The present invention is shown by way of explanation as applied to a diaphragm chuck of identicaly the same construction as that shown and described in our prior application above identified, the only difference being in the construction of the back-up members and the method of securing them to their associated jaw bases.

Referring now to the accompanying drawing, and particularly to Fig. 1, the diaphragm chuck there shown by way of illustration includes a disk-like mounting member 10 which is piloted upon the forward face of a flange 12 formed integrally with the forward end of a machine tool spindle 14, the mounting member 10 being secured to the flange 12 by means of screws 16. Piloted upon the forward face of the mounting member 10 is a ring 18 which, as will hereinafter be more fully brought out, constitutes a cylinder. A backing plate 20 is piloted upon the forward face of the ring 18. Screws 22 project rearwardly through the backing plate 20 and ring 18 and are threaded into the mounting plate 10 to secure all of these parts together in assembled relationship. Additionally, screw 24 projecting forwardly through the ring 18 and threaded into the backing plate 20 serves to maintain these two parts in assembled relationship for assembly purposes. A cup-shaped diaphragm 26 forms the axially outer face of the chuck and the open end thereof is received over and piloted upon the periphery of the backing plate 20 and while, in accordance with the present invention, it may be secured thereto by any suitable means, it is preferably brazed or welded thereto. The diaphragm 26, as brought out in Fig. 1, increases in thickness radially from its peripheral portion to the central portion as is common in this type of chuck.

Although forming no part of the present invention and shown simply by way of illustration as one means for operating the diaphragm 26, a piston 28 is slidably received in the bore of the ring 18 and its periphery is provided with a conventional O-ring seal 30 engaging the bore of the ring 18 to effect a seal between the periphery of the piston and the bore of the ring 18. A sleeve 32 concentric with the axis of the chuck is axially slidably received in a central bore in the backing member 20 and abuts at its opposite ends against the forward face of the piston 28 and the rear face of the diaphragm 26, respectively, for transmitting force from the piston to the diaphragm in order to move the central portion of the latter axially outwardly to spread the jaws to receive a piece of work therein. To actuate the piston 28, a tube or pipe such as 34 is threaded into a central opening 36 in the mounting plate 10 and may be connected to any suitable source of fluid under pressure. Upon the application of pressure to the tube or pipe 34, such pressure is exerted between the rear face of the piston 28 and the forward face of the mounting plate 10 and acts to spring the center of the diaphragm 26 outwardly by pressure applied through the sleeve 32. Preferably, the diaphragm 26 is centrally cut away as at 38 to a diameter equal to the bore of the sleeve 32 so as to permit work to project axially through the diaphragm where necessary for proper chucking operations. In the particular case shown, the piston 28 is provided with a central opening therein which is closed by a screw member 40 secured in place by means of a nut 42. The screw member 40 is provided with a forwardly opening central threaded aperture 44 in which a suitable stop member such as 46, adapted to engage and limit the projection of a piece of work through the opening 38, may be threadably received.

The above described features form no part of the present invention, but do form at least a part of the subject matter of our United States Patent No. 2,403,599 and our copending application for Letters Patent of the United States for improvements in Diaphragm chuck, Serial No. 683,456, filed July 13, 1946, and Serial No. 683,458, filed July 13, 1946.

It will be appreciated, of course, that a diaphragm chuck constructed in accordance with the present invention may be equipped with any desired number of jaws, the chuck shown by way of illustration in the drawings being shown as equipped with four equally angularly spaced jaws simply for the purpose of illustration. To mount each jaw of the diaphragm there is a corresponding jaw base 50. Each jaw base 50, in the particular form shown, comprises a radially elongated and rectangularly sectioned piece of metal which is rigidly secured to the outer axial face of the diaphragm 26. While the manner of securing the jaw bases 50 to the diaphragm 26 in accordance with the present invention is immaterial, preferably and as disclosed and claimed in our above referred to copending application, Serial No. 683,456, filed July 13, 1946, they are preferably welded or brazed to the diaphragm 26 so as, in effect, to be integrally united therewith, thereby to positively preclude possibility of shifting or creeping under repeated flexing of the diaphragm. As brought out in Figs. 3 and 5, each jaw base 50 is longitudinally and centrally provided in its outer face with a dovetail groove 52.

The jaws 56 are radially elongated and generally of rectangular cross-sectional configuration except that the axially inner face of each is provided with a dovetail rib 58 which, as best brought out in Fig. 5, is complementary to and is received in the dovetail groove 52 of the corresponding jaw base 50. The fit between the dovetail rib 58 and the dovetail groove 52 is preferably such as to draw the axially inner faces of the jaws 56 along the base of the rib 58 into contacting engagement with respect to the axially outer face of the jaw base 50, as shown. Also, as best brought out in Fig. 5, each jaw 56 is medially and longitudinally slotted as at 60 over its full length and from its axially inner face to a point adjacent to but spaced from its axially outer face, so as to render its axially inner edge more or less laterally flexible. One or more setscrews 62, shown as two for the purpose of illustration, are threaded through one of the slotted sides of each jaw 56 intermediate the inner and outer ends of the corresponding slot 60 and their inner ends abut against the other slotted side of the jaw. From this it will be appreciated that when a jaw 56 is mounted on its corresponding jaw base 50 with its rib 58 in interfitting relation with respect to the groove 52 of such jaw base and the setscrews 62 are tightened up, the inner edge of the jaw 56 is caused to be spread and the beveled sides of the ribs 58 in being expanded against the beveled sides of the groove 52 not only serve to draw the axially inner face of the jaw 56 against the axially outer face of the jaw base 50, but tend to frictionally lock all of these surfaces together and thereby lock the jaw 56 in radially adjusted position to the base 50.

Radially outwardly of each jaw 56 an adjusting screw support or back-up member 70 is mounted on each jaw base 50. As best brought out in Figs. 3 and 4, each back-up member 70 is provided on its axially inner face with a dovetail bead or rib 72 which is substantially identical to the dovetail bead 58 of the jaws 56, and which correspondingly is arranged in interfitting relationship with respect to the dovetail groove of the jaw base. Each back-up member 70 is provided with a central radial opening 74 which threadably receives a radially directed adjusting screw 76, the radially inner end of which abuts the corresponding jaw 56. A lock nut 78 threaded on each screw 76 radially outwardly of the corresponding back-up member 70 is adapted to bear against the latter to lock the screw 76 in its axially adjusted position in its back-up member 70.

The construction thus far described is identical to that disclosed and claimed in our copending application first above identified. The difference between the present invention and that disclosed in said prior application above identified relates to the locking of the back-up members 70 to their respective jaw bases 50, and this will now be described. Each back-up member 70 is provided with a transverse bore 80 arranged with its axis perpendicular to the outer face of the diaphragm 26 and in intersecting relation with respect to the axis of the adjusting screw 76 carried thereby. The axially inner end of the bore 80 joins with a concentric frusto-conical bore portion 82 located approximately in centrally disposed relation with respect to the plane of junction between the rib or bead 72 and the body of the back-up member 70, and the small end of the portion 82 in turn joins with a concentric smaller cylindrical bore portion 84. The bore portion 80 is of a size to relatively loosely receive the head 86 of a locking screw having a frusto-conical portion 88 whose surface is complementary to the surface of the bore portion 82 against which it bears, and a threaded body 90. The jaw base 50 and diaphragm 26 are each provided with one or more aligned openings 92 and 94, respectively, for receiving the body 90 of such screw, the opening 92 at least being threaded for threadable reception of the body 90. Additionally, where a counterweight such as 96 is employed on the rear face of the diaphragm 26 in line with each jaw assembly, as is preferable to offset the tendency of the jaw assembly to open up under centrifugal force during operation, each of the latter is provided with a threaded opening 98 aligned with the openings 92 and 94 for reception of the body 90 of such screw. The counterweights 96 are preferably welded or brazed to the inner face of the diaphragm 26 in the same manner as the jaw bases 50.

The heads of the screws 36 are of such axial length that when such screws are tightened up the axially outer ends of the heads 86 are substantially tangent to the adjacent side of the corresponding adjusting screw 76, this being a feature similar to the relationship of the adjusting screws and locking screws of our prior application first above identified, which provides a mechanical lock preventing inadvertent loosening of the locking screws and consequent danger of the backing-up members sliding off the jaw bases under centrifugal force during operation.

As best brought out in Fig. 4, this backing-up member 70 is centrally slotted from its bore 74 through the dovetailed rib or bead 72 in a direction parallel to the length of the bead or projection 72 and the dovetail groove 72 of the corresponding jaw base 50. Consequently, with the above described arrangement, when the locking screws are tightened up the following action takes place. First, because of the axially inward movement of each locking screw and because of the engagement of the head portions 86—88 thereof with the corresponding back-up member 70, the back-up member 70 is drawn axially inwardly so as to bring its flat axially inner face, that is that face at the junction between the body of the back-up member 70 and the rib or bead 72 thereof, into the flat contacting frictional engagement with the flat axially outer faces of the corresponding jaw base 50. Furthermore, because the frusto-conical portion 88 of each locking screw bears against the complementary surface 82 of the corresponding backing-up member 70 in tightening up the locking screw, the inner end portion and particularly the rib or bead 72 of the back-up member is spread laterally and its tapered sides are frictionally engaged with the tapered side walls of the corresponding groove 52, so as not only to frictionally lock them thereto but to set up a force, in addition to the pull of the locking screw itself, tending to draw the back-up member axially inwardly into frictional locking engagement with the corresponding jaw base 50. Furthermore, the locking screws themselves, because of the complementary interengagement of the portions 88 thereof with the bore portions 82 and the threaded engagement with the corresponding jaw bases 50 serve to provide a rigid unyielding means mechanically locking each back-up member 70 to its corresponding jaw base 50. As a result of the above described features, it has been found that the back-up members 70 are so securely and positively locked to their jaw bases 50 that inadvertent shifting of the back-up members on the jaw bases is absolutely precluded under any normal operating conditions and, as a result, great numbers of identical parts may be chucked one after the other and brought to identically the same position with respect to the axis of rotation of the chuck for a machining operation thereon.

Having thus described our invention, what we claim by Letters Patent is:

1. In a diaphragm chuck of the class including a mounting plate and a diaphragm peripherally secured thereto, a radially directed jaw base fixed to the axially outer face of the diaphragm and having a dovetail groove extending radially thereof in the outer face thereof, a jaw received by said jaw base and having a dovetail rib thereon received in the dovetail groove of said jaw base, and means for locking said jaw to said jaw base, the combination with said jaw base and jaw of a back-up member for said jaw including a body having a dovetail projection thereon received in said groove of said jaw base at one end of said jaw, a radially directed adjusting screw threaded through said body of said back-up member and operatively engage said jaw base, the axially inner end of said back-up member being slotted in a plane radial of the axis of said chuck, and a screw projected through said back-up member in parallel relation with respect to the axis of said chuck and threading into said jaw base, said screw and back-up member having complementary frusto-conical surfaces acting to spread such slotted end of said back-up member in said groove upon tightening of said screw.

2. In a diaphragm chuck, a supporting means; a back-up block slidably mounted on said supporting means; guide means interconnecting said supporting means and said back-up block including a dovetail groove in said supporting means and a dovetail rib on said block and in said groove; and means for clamping the back-up block on said supporting means including a slot in said block longitudinally bisecting said rib, and a screw extending through the slot and threaded into said supporting means, a portion of said screw in said slot being tapered and said tapered portion bearing against the sides of the slot whereby said screw is operative to pull the block solidly against the supporting means and simultaneously to press the portions of the rib at opposite sides of the slot laterally apart and against the sides of said groove.

3. In a diaphragm chuck, a supporting means; a back-up block slidably mounted on said supporting means; guide means interconnecting said supporting means and said back-up block including a dovetail groove in said base and a dovetail rib on said block and in said groove; a slot in said back-up block extending longitudinally through said dovetail rib and permitting the portions of said rib at opposite sides of the slot to be flexed relative to the sides of said dovetail groove; and cam means for clamping the block against said supporting means and simultaneously pressing the flexible portions of said dovetail rib solidly against the sides of said dovetail groove.

4. In a diaphragm chuck, a supporting means; a back-up block slidably mounted on said supporting means; a dovetail groove in said supporting means below said block; flexible members on said block defining a dovetail rib and said rib slidably disposed in said dovetail groove; and cam means for clamping the back-up block against said supporting means and simultaneously spreading the flexible members solidly against the sides of said dovetail groove.

5. In a diaphragm chuck, a supporting means having a dovetail groove; a back-up block on said supporting means; flexible members on said block defining a dovetail rib and said rib slidably disposed in said dovetail groove; means for clamping the back-up block against said base; and means for spreading said flexible members to press the same solidly against the sides of said dovetail groove.

GEORGE HOHWART.
ERNEST F. HOHWART.

REFERENCES CITED

The following references are of record in the file of this patent:

UNITED STATES PATENTS

| Number | Name | Date |
|---|---|---|
| 152,779 | Van Fleet | July 7, 1874 |
| 1,956,318 | Draper | Apr. 24, 1934 |
| 2,331,111 | Dunn | Oct. 5, 1943 |
| 2,389,366 | Jones | Nov. 20, 1945 |